Dec. 16, 1958  J. G. MASONI  2,864,599
TUNNEL BORING MACHINE HAVING OPPOSITELY ROTATING HEADS
Filed Jan. 23, 1952  3 Sheets-Sheet 1

INVENTOR.
JOHN G. MASONI
BY

Dec. 16, 1958 J. G. MASONI 2,864,599
TUNNEL BORING MACHINE HAVING OPPOSITELY ROTATING HEADS
Filed Jan. 23, 1952 3 Sheets-Sheet 2

INVENTOR.
JOHN G. MASONI

Dec. 16, 1958  J. G. MASONI  2,864,599
TUNNEL BORING MACHINE HAVING OPPOSITELY ROTATING HEADS
Filed Jan. 23, 1952  3 Sheets-Sheet 3

INVENTOR.
JOHN G. MASONI
BY

United States Patent Office 2,864,599
Patented Dec. 16, 1958

2,864,599

TUNNEL BORING MACHINE HAVING OPPOSITELY ROTATING HEADS

John G. Masoni, Independence, Ohio

Application January 23, 1952, Serial No. 267,850

1 Claim. (Cl. 262—7)

This invention relates to a machine for boring tunnels and particularly designed for removing material by cutting it from the face of the tunnel and then conveying it therefrom to any suitable carrier.

In tunnel boring and drilling operations, using the various methods now employed, it is always a major problem to remove the loosened earth or rock from the face or head of the tunnel.

Heretofore, it has been attempted to drill or bore into the earth or rock after the manner of an auger, and such operations are limited in two ways. First, the size of the auger and the length of its screw conveyor vanes must remain within practical limits of diameter, although drillings with large auger-like devices have been accomplished within limits, using auger-like tools, up to two or two and a half feet in diameter. However, the power required to remove the material loosened at the cutting end by moving it along the bore increases with the depth of the bore. Thus, the depth of such drilling is limited to a matter of a few feet or yards. Then, other methods must be used to remove the remaining material out to the sides and contour of the tunnel, thus establishing a new tunnel face or head.

Second, such auger boring still leaves the problem of carrying away the borings delivered by the screw of the auger, as by transferring them manually into the dump conveyor cars, or the like.

The present invention contemplates greatly increasing the diameter of a boring device, and the removing of the loosened material from the face of the tunnel, and continuously conveying it backwardly a matter of several feet or yards, and there delivering it into suitable receptacles or car conveyors for removal from the tunnel. Thus, the boring for the full diameter of the tunnel, which may be five, ten or fifteen or more feet in diameter, is continuous except for intermittent advancement of a carrier for the boring and conveying structure.

In carrying out my invention I provide a large cutting head adapted to be revolved and acting to loosen and remove material from the entire (usually substantially vertical) face of the tunnel. This boring head, as indicated, may be four to fifteen feet in diameter, or more. For example, a boring head, ten feet in diameter or more, may comprise a circular ring carrying cutting teeth adapted to remove material from the tunnel face over its entire area as it is revolved while being forced against the tunnel face. The head carries means for causing the loosened material to move inwardly toward the center of the head.

At the center of the head, and of a diameter approximately one-fifth or less of that of the head, I provide a boring unit in the nature of an auger, which cuts the central area of the tunnel face, and which is revolved much more rapidly than the large cutting head.

The auger may extend through a conveyor tube which may also serve to carry the large cutting head. By rotating the auger at a much higher speed than the cutting head, say, ten to fifty revolutions of the auger for each revolution of the cutting head, the material loosened by the large cutting head, and conveyed inwardly toward its center as it revolves, is delivered to the spiral vanes of the auger, and is passed backwardly by screw conveyor action and delivered from the rear end of the tube and into a receptacle such as a conveyor car used in tunneling operations.

Essential objects of my invention are to provide such an apparatus in which the parts shall be simple to construct, effective in operation, and durable in use.

A general object is to provide a tunnel boring machine which shall move forwardly, cutting the full area of the face of the tunnel at greater speeds and more effectively than present tunneling methods, and which continuously removes the cut material.

More specific objects include the provision of such an apparatus which shall comprise the large cutting head, the smaller central boring and screw conveyor auger, and a mounting carriage therefor on which the head and conveyor tube connected with the same may be rotatably mounted and powerfully driven while being forced forwardly toward the tunnel face with sufficient power and at the desired rate of advance.

Further objects include utilizing a simple means for supporting the carriage and guiding the same for accurate alignment and control of the cutting operation, and further for providing for intermittent advancement of the carriage—a few feet or yards at a time.

Still other objects include provision of a simple means for anchoring the carriage to firmly hold the same against the pressure required to move the cutting head and auger into the tunnel face as they are revolved, and at suitable speeds of advance, as may be governed by the nature of the material into which the tunnel is being cut.

Another specific object is to provide for maintaining direction and tunnel alignment, while holding the carriage firmly against the reaction of the driving and rotating force for the large cutting head and the auger.

Other advantages and objects will become apparent in the following description which relates to the accompanying drawings.

It is to be understood that various mechanical modifications may be made within the spirit and scope of my invention as set forth in the appended claim.

The principle of the invention may be briefly stated to include essentially the idea of advancing a large boring tool against a tunnel face, removing material therefrom over its entire area by rotating motion of the cutting head; bringing the removed material to a centrally located more rapidly rotating screw conveyor, and delivering substantially all of said material to a point remote from the tunnel face.

In the drawings is shown an illustrative embodiment of the present application, and in which.

Figure 1:
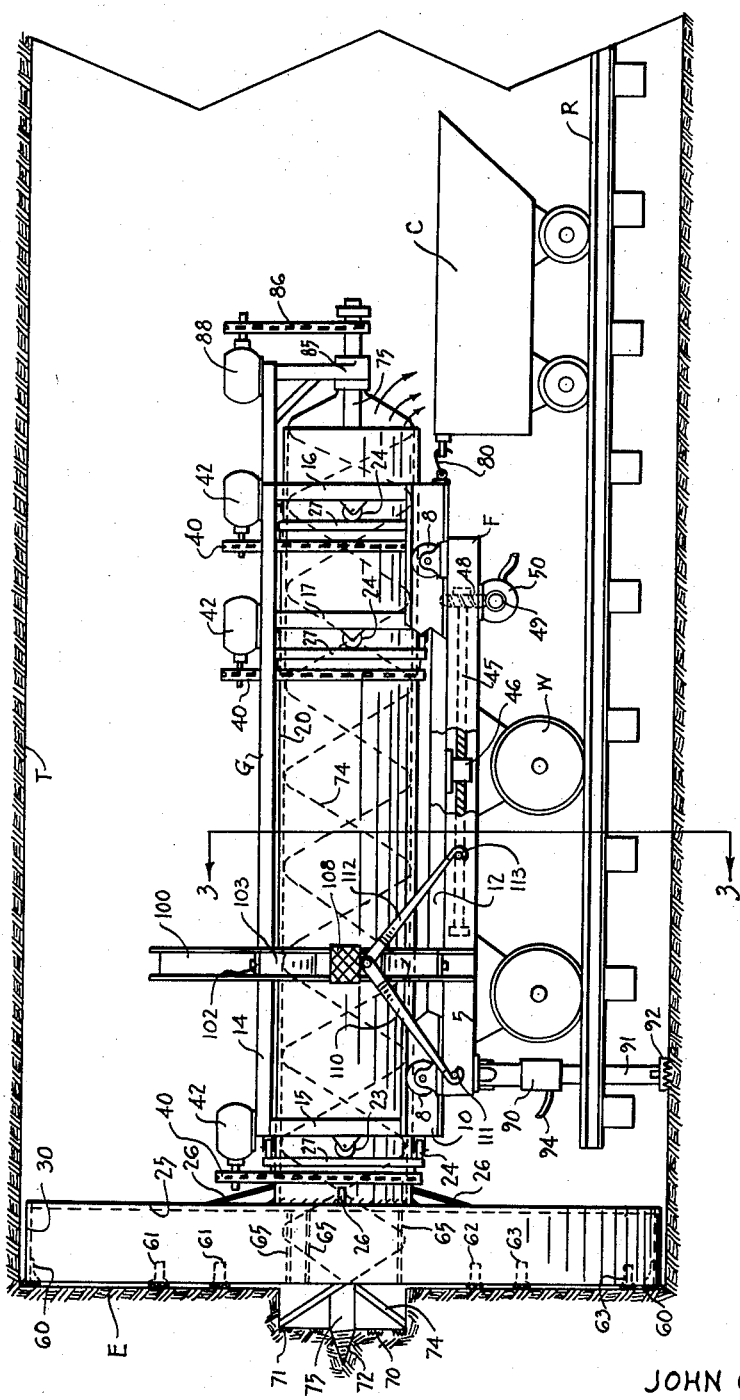
Fig. 1 is a side elevation of my tunnel boring machine within a tunnel, the tunnel being indicated in section and some of the parts of the machine being broken away for clearness of illustration.

Describing the construction shown by the use of reference characters, E indicates the earth or rock formation into which a circular tunnel T is being cut.

A suitable track is indicated at R comprising rails and cross ties at the bottom of the tunnel. Adapted to move along this track, as it is periodically extended to follow the boring operation to be described, is a carriage having wheels W and an elongated rectangular frame F of any suitable construction, and shown as comprising essentially longitudinal members 5 and 6 connected by cross members and supporting a relatively slidable carrier frame G, preferably by means of rollers 8 and 9, embraced by outwardly facing channels 10 and 11 extending longitudinally of the supporting frame. This supporting frame is shown as comprising essentially four longitudinal members 12 and 14 connected by cross members and vertical members indicated at 15, 16 and 17, and braced by additional members, if desired.

Extending through this frame and rotatably mounted therein is a large cylindrical conveyor tube member 20, which, in the construction shown, is rigidly connected at its forward end with a back plate 25 of a rotating boring head.

Extending forwardly from the perimeter of the back plate is a short cylindrical member 30 of slightly smaller diameter than the bore of the tunnel T. The back plate and tube may be suitably braced as by gussets indicated at 26.

The tubular member 20 is shown as supported in the frame by a plurality of roller wheels indicated at 22 (Fig. 3) and may be rotated by suitable driving means of sufficient power to rotate the cutting head, as will presently appear.

To effect a forward thrust upon the driving and conveyor tube, and thus on the cutting head, rollers such as indicated at 23 and 24, shown as mounted on cross members 15 and 16 and on vertical members of the supporting frame, may bear against rings or flanges 27 surrounding and rigid with the tube 20.

These flanges may formed rigid with sprocket teeth on the same rings, and which may be engaged by sprocket chains 40 driven by suitable motors 42, each having a small sprocket wheel engaging one of these chains. It is desirable to use small motors for this purpose, and they are preferably air-driven, and obviously any suitable number of them may be used as required.

Suitable means are provided for moving the supporting frame G forwardly upon the supporting carriage F while it is being guided and supported by the rollers 8 and 9 in the channels 10 and 11. This means is shown as comprising a feed screw 45, rotatably mounted and connected with the carriage frame F and threaded through a driving nut indicated at 46, rigidly connected with the conveyor tube supporting frame. The screw, in turn, may be rotated for slowly moving the frame G, with the tube 20 and the cutting head, with relation to the supporting carriage. For this purpose I have indicated a worm gear 48 driven by a worm 49 suitably connected with and driven by a motor indicated at 50. This motor may be geared for further speed reduction, and may, of course, be of suitable size and form.

Referring again to the large face-cutting head, the outer short cylinder or flange 30 is shown as provided with cutting teeth 60, preferably three or more, uniformly spaced about its perimeter and projecting radially outwardly for the purpose of cutting the earth or rock slightly beyond the circumference of the cylindrical member 30.

Rigid with the back plate 25 and leading from the inside of the cylindrical flange 30 are a plurality of spiral inwinding baffle conveyor blades 65. These are rigidly connected as by welding, or other suitable means, with the flange 30 and the back plate 25. Each baffle preferably follows a path curving inwardly and presenting a uniform slope or angle to any radial line through the baffle, whereby, as the cutting head revolves, material loosened from the face, at all points, will be progressed or cammed inwardly toward the opening at the center with which the tube 20 communicates.

Teeth indicated at 61, 62 and 63 are so arranged as to effect a cutting over the entire circular area outside of that of the diameter of the tube 20 to the paths cut by the teeth 60 slightly beyond the rim flange 30.

Figure 4:
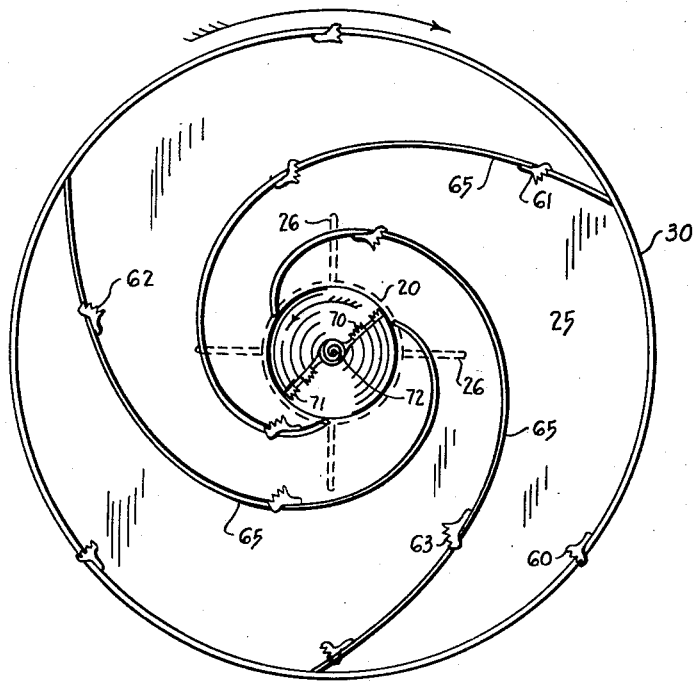
Fig. 4 is an elevation showing the cutting face and cutting end of the head and auger.

The contour shown in Fig. 4 of these spiral inwardly feeding vanes or baffles is suitable for a large variety of consistencies of earth and rock formation.

Figure 2:
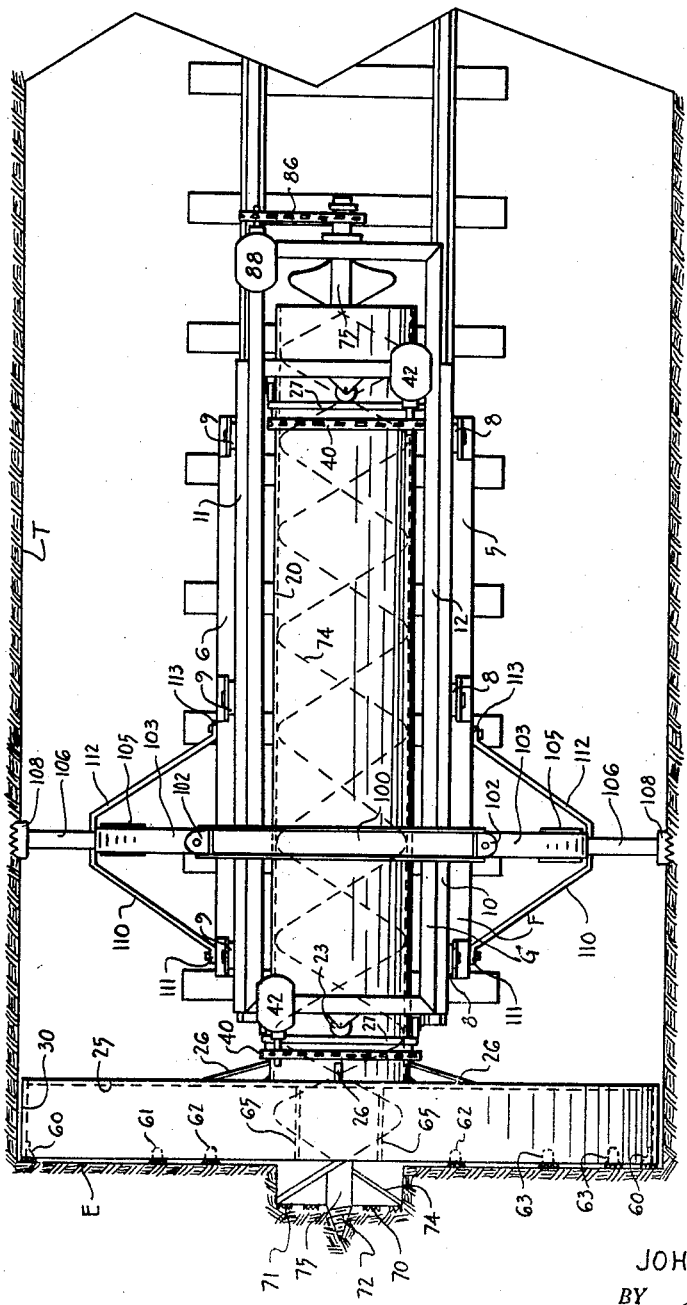
Fig. 2 is a similar view, looking down on the machine, and likewise indicating the tunnel in section.

It will be seen that if such a cutting head is forcibly held against the face of the tunnel and is rotated while so held, and is advanced a slight distance for each rotation, the cutting teeth will uniformly remove the earth from the surface, as indicated in Figs. 1 and 2. However, at this point, it should be noted that except for the present invention, an extremely serious problem would now be presented, namely, that of removing the loosened earth so cut from the face of the tunnel. My invention solves this problem in a simple and effective fashion, as indicated in the foregoing objects and statements, by boring the small central area while removing earth therefrom at the same rate of advance, and then effecting removal of all of the loosened earth or rock particles by the more rapidly turning screw conveyor.

To this end I have provided what amounts to a boring auger within the tube 20, and having a diameter substantially equal to the inner diameter of the tube, and revolving therein at a much greater speed than that of the turning of the large cutting head.

In the drawings I have shown an auger bit having cutting edges 70 with cutting teeth 71; a central forwardly projecting taper screw point 72 and spiral vanes 74 rigid with the central shaft member 75, and of a diameter such that they may turn freely within the tube 20. These spiral vanes, as indicated particularly in Fig. 1, extend rearwardly through the tube and project outwardly at the rear end of the same, and constitute screw conveyor means for moving all of the material cut by the auger and that delivered to the forwardly projecting portion of the auger where it extends beyond the end of the tube 20. The vanes 74 within the zone of the baffles 65 within the cutting head receive the loose material and move the same rearwardly and out of the rear end of the tube 20, and thence into a suitable cart or scoop, indicated at C.

Such carts are commonly used for hand-loading of material removed from the face of a tunnel, and are usually mounted on wheels on the track R. The dump receptacle may be secured to the forwardly moving tube supporting frame by any convenient means, such as a hook shown at 80, and, of course, the receptacle is replaced when filled.

The central shaft 75 of the auger and conveyor extends rearwardly through a suitable bearing 85, and may carry a sprocket receiving a driving sprocket chain 86, in turn driven by the motor 88 similar to the motors 42. The gear ratio and motor speed are such that the auger and its screw conveyor vanes are rotated within the tube at, say, from ten to fifty times as rapidly as the large cutting head is revolved. This speed ratio is determined by the conditions—principally that of how much material is removed at each revolution of the large cutting head.

Figure 3:
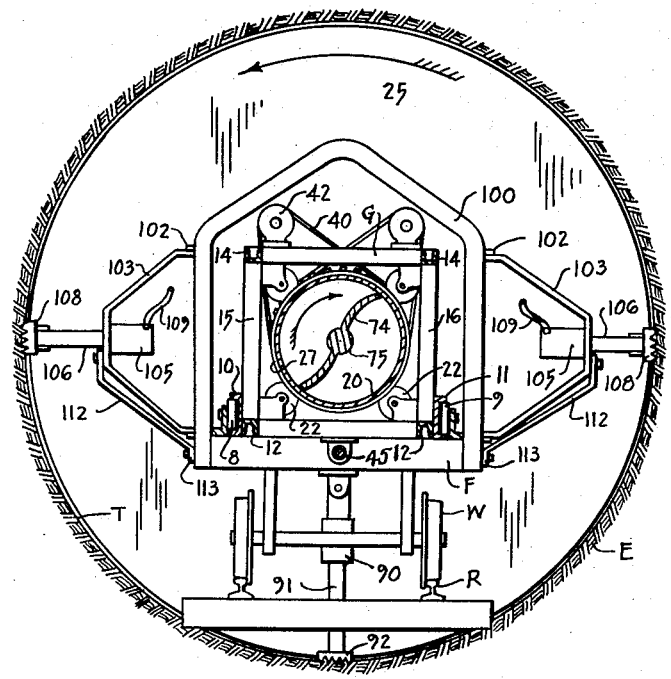
Fig. 3 is a rear elevation of the cutting head and a portion of the carrier, and showing parts in section, taken on a plane indicated by the line 3—3 of Fig. 1.

The arrows shown in Figs. 3 and 4 indicate the auger rotating in a direction opposite to that of the face-cutting head, although under some conditions the auger may rotate at its higher speed in the same direction as the cutting head.

The auger cutting edges, which, incidentally, may also have removable cutting teeth elements corresponding in general function to the teeth 60, 61, etc., may bore into the central area of the earth within the head without any burden upon its capacity. Thus, without undue power requirements, it may also be rotated at the desired higher rate of speed needed to convey all of the material removed from the cutting face and brought to the vanes of the auger, ahead of the tube 20, and at the central portion of the cutting head. The auger preferably projects forwardly slightly, a matter of inches to a foot or so beyond the cutting face of the large cutting head, as shown in Figs. 1 and 2.

In order to prevent the forward overhanging weight of the cutting head from tending to lose the proper, generally horizontal direction, it is desired to support the forward end of the carriage F rigidly. This may be accomplished by an adjustable jack preferably having a cylinder portion 90 suitably connected with the forward end of the carriage, and a plunger extension 91 projecting downwardly and carrying a foot member in the form of a toothed pad 92 engaging the earth at the bottom of the tunnel. By hydraulic control, as through a tube indicated at 94, the precise vertical steering of the cutting head may be uniformly and continuously controlled during each cutting operation for each setting of the boring machine.

The turning torque and forward pressure on the large cutting head is obviously very substantial, and to hold the carriage F in each set position while the conveyor tube and head are moved by the feed screw 45, firm anchorage of the carriage must be provided. This anchoring means preferably also serves to prevent any tendency of the carriage to twist. To this end, I have shown outriggers mounted on the carriage F and adapted to engage the sides of the tunnel, and arranged to resist the longitudinal pressure for driving the cutting head into the face of the tunnel as well as to resist the torque required to rotate the cutting head.

A loop-shaped frame member 100 rigid with the carriage F extends upwardly and over the top of the frame G, supporting the conveyor tube, and is provided with clearance permitting the movement of the driving motors 42 therethrough. This member 100 is indicated as comprising a channel into which are fitted pairs of pivots 102, each supporting an outwardly projecting loop-shaped arm 103, each of which carries a hydraulic jack comprising a cylinder 105, plunger 106 and a pivoted earth-engaging foot pad 108.

Here again, hydraulic tubes 109 are indicated as provided and leading to the jack cylinders to control the outward pressure on and position of the jack, plunger 106 and pads 108, and whereby the lateral direction of the boring may be precisely controlled for maintaining the true desired direction of the tunnel as it is being cut.

Any suitable means may be used for holding the outrigger arms in their active positions and relatively rigidly with relation to the carriage frame F. For illustration only, I have shown braces 110 and 112 which may be pivoted to the outrigger arms 103 and hooked or similarly secured to the side frame members as at 111 and 113. Thus, it will be seen that longitudinal pressure counteracting the forward pressure on the boring head and auger may be resisted by the rigid anchoring effect of the pivoted outrigger arms now rigidly held by these brace members. It is desirable that they should be detachable at one end or the other to permit the outriggers to be swung toward the carriage when moving the carriage to a new position for re-setting.

Assuming that the supporting frame has been moved rearwardly on the carriage F by rotating the screw 45 to bring the nut 46 to the right in Fig. 1, the carriage F is now moved forwardly, bringing the cutting head against the face E of the tunnel. The jack 90 and its foot 92 and the braces 110 and 112 are suitably positioned, and the engaging pads 108 are then thrust outwardly into firm engagement with the sides of the tunnel.

The motors 42 and 88 may now be started. The large cutting head is driven slowly, say, a few revolutions a minute, depending on the size of the tunnel and the nature of the earth into which the tunnel is being cut.

The auger and spiral conveyor is driven much more rapidly, cutting the central area a short distance ahead of the plane of the main cutting face, and the spiral auger vanes remove the material delivered to them by the inwinding baffles 65 of the cutting head, and the material is conveyed through the tube and dumped at the rear into the receptacle C.

The bearing 85 effects the thrust necessary for the auger. The rollers 23 and 24 resist the reaction of pressure on the face of the cutting head while the screw 45 feeds the cutting head and auger and the carrier frame forwardly at the desired speed and for a distance of several feet or yards at each setting, depending on the size of the machine.

At the forward limit of the screw 45 and sliding frame G, the cutting operation is stopped and the carriage F and the supporting jack and outriggers are again reset and a new cycle of cutting operation may begin.

It will be seen that the difficulty indicated in the foregoing statement of objects in respect to handling the material cut from the face of the tunnel has been eliminated. The cutting operation for each cycle may be continuous, and the removal of the loosened material is likewise simultaneous. The accuracy of control of direction and cutting to full capacity of such machine have been accomplished by simple effective means.

It has been determined that it is possible with a tunnel boring machine constructed according to my invention to cut material from the entire face of a tunnel of large diameter, such, for example, as fifteen feet or more. The amount of material removed by the main cutting head at each revolution need only be a fraction of a cubic foot to one cubic foot or more. The auger and screw conveyor action may easily dispose of all such material, brought to it by the spiral baffles in the cutting head, and, correspondingly, easily deliver it to the dump cart or receptacle at the rear. The power required for removing one or two cubic feet or more at each revolution of the cutting head is consistent with the power, strength and compactness of such a machine.

The desirable end result is that of boring such a tunnel by my machine much more rapidly than is possible by present methods, and correspondingly with less expense. Obviously tunnel projects now prohibitive because of high cost may be reconsidered, and long needed tunnels may now be reasonably expected to be within the range of the budgets of municipalities and of Government agencies.

Having thus described my invention, what I claim is:

The combination of a tunnel-face cutting-head comprising a circular frame plate having a cylindrical forwardly extending flange member at its periphery, baffle plate members rigid with said circular frame plate and said cylindrical flange, and sloping inwardly and terminating near the center of the head, the head plate having a central opening, an auger-like boring tool projecting through said opening and having radial tooth carrying elements at the cutting face and having rearwardly extending spiral vanes, a tubular member surrounding the boring tool, bearing members for rotatably supporting the boring tool, said tubular member forming a conveyor and being rigidly connected with and supporting the cutting head, means for driving the tubular member to rotate it and the cutting head in one direction, independent means for rotating the auger-like boring tool and its vanes in an opposite direction, a rigid frame having longitudinally spaced bearings for rotatably supporting said tubular member adjacent to the cutting head, a carriage on which said frame is longitudinally movably mounted, means for securely anchoring said carriage within the tunnel being cut, and means for moving the frame and tubular member and cutting head with relation to the carriage, said independent means for rotating the auger-like boring tool comprising a motor mounted on said frame and a driving connection from said motor to the auger-like boring tool.

References Cited in the file of this patent

UNITED STATES PATENTS

| | | |
|---|---|---|
| 825,857 | Moran et al. | July 10, 1906 |
| 1,462,997 | Anderson | July 24, 1923 |
| 1,501,093 | Blower | July 15, 1924 |
| 1,511,957 | Freda | Oct. 14, 1924 |
| 1,653,111 | Lobbey | Dec. 20, 1927 |
| 2,083,834 | Galuppo et al. | June 18, 1937 |
| 2,165,666 | Tilly | July 11, 1939 |
| 2,250,670 | Joy | July 29, 1941 |
| 2,466,709 | Karr | Apr. 12, 1949 |
| 2,575,975 | Robbins | Nov. 20, 1951 |
| 2,669,441 | Castanoli | Feb. 16, 1954 |

FOREIGN PATENTS

| | | |
|---|---|---|
| 162 of 1868 | Great Britain | Jan. 17, 1868 |